US012786092B2

(12) United States Patent
Shicht et al.

(10) Patent No.: US 12,786,092 B2
(45) Date of Patent: Nov. 3, 2026

(54) SEQUENTIAL EVENT TRACKER WITH LOOSE ACCESS ATOMICITY

(71) Applicant: Mellanox Technologies, Ltd., Yokneam (IL)

(72) Inventors: Yuval Shicht, Tel Aviv (IL); Miriam Menes, Tel Aviv (IL); Ariel Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 141 days.

(21) Appl. No.: 18/815,046

(22) Filed: Aug. 26, 2024

(65) Prior Publication Data

US 2025/0274372 A1 Aug. 28, 2025

(51) Int. Cl.
*H04L 43/16* (2022.01)
*G06F 11/30* (2006.01)

(52) U.S. Cl.
CPC .......... *H04L 43/16* (2013.01); *G06F 11/3006* (2013.01); *G06F 2201/86* (2013.01)

(58) Field of Classification Search
CPC .. G06F 11/3006; G06F 2201/86; H04L 43/00; H04L 43/04; H04L 43/16
See application file for complete search history.

(56) References Cited

U.S. PATENT DOCUMENTS

| | | | | |
|---|---|---|---|---|
| 2009/0172291 A1* | 7/2009 | Sprangle | G06F 12/127 | 711/134 |
| 2014/0181404 A1* | 6/2014 | Chaudhary | G06F 12/0817 | 711/143 |
| 2023/0305960 A1* | 9/2023 | Polishuk | G06F 12/0811 | |

* cited by examiner

*Primary Examiner* — Khoa Huynh
(74) *Attorney, Agent, or Firm* — Lowenstein Sandler LLP

(57) ABSTRACT

A device includes a cache to store an array that tracks occurrence of events and a processing device coupled to the cache. The processing device tracks control values associated with a state of cache lines of the array. The processing device tracks, within the cache lines, a window of cell index values corresponding to event identifier values and having a window size that moves with an occurrence of any event that is positioned beyond the window. In response to detecting an event, the processing device updates a first value of a particular cache line of the cache lines based on a control value that corresponds to the particular cache line and on whether the first value is located within a range of cell index values currently defined by the window.

34 Claims, 9 Drawing Sheets

300

| New packet | Current control | | | | | Current bitmap | | | | | | | | | | | | | | | | Flow |
|---|---|---|---|---|---|---|---|---|---|---|---|---|---|---|---|---|---|---|---|---|---|---|
| TN | TS | WZ | | | | | | | | | | | | | | | | | | | | |
| | | 0 | 1 | 2 | 3 | 0 | 1 | 2 | 3 | 4 | 5 | 6 | 7 | 8 | 9 | 10 | 11 | 12 | 13 | 14 | 15 | |
| 3 | 0 | 0 | 1 | 1 | 1 | N | N | N | N | X | X | X | X | X | X | X | X | X | X | X | X | TS < TN, iN <= iS + M, TS < W, TN < W, WZ(0)=1 |
| | | 0 | 1 | 2 | 3 | 0 | 1 | 2 | 3 | 4 | 5 | 6 | 7 | 8 | 9 | 10 | 11 | 12 | 13 | 14 | 15 | |
| 6 | 3 | 0 | 1 | 1 | 1 | N | N | N | N | X | X | X | X | X | X | X | X | X | X | X | X | TS < TN, iN <= iS + M, TS < W, TN < W, WZ(1)=1 |
| | | 0 | 1 | 2 | 3 | 0 | 1 | 2 | 3 | 4 | 5 | 6 | 7 | 8 | 9 | 10 | 11 | 12 | 13 | 14 | 15 | |
| 1 | 6 | 0 | 0 | 1 | 1 | N | N | N | Y | N | N | Y | X | X | X | X | X | X | X | X | X | TN <= TS, WZ(0)=0 |
| | | 0 | 1 | 2 | 3 | 0 | 1 | 2 | 3 | 4 | 5 | 6 | 7 | 8 | 9 | 10 | 11 | 12 | 13 | 14 | 15 | |
| 8 | 6 | 0 | 0 | 1 | 1 | N | Y | N | Y | N | N | Y | N | X | X | X | X | X | X | X | X | TS < TN, iN <= iS + M, TS < W, TN < W, WZ(2)=1 |
| | | 0 | 1 | 2 | 3 | 0 | 1 | 2 | 3 | 4 | 5 | 6 | 7 | 8 | 9 | 10 | 11 | 12 | 13 | 14 | 15 | |
| 23 | 8 | 0 | 0 | 0 | 1 | N | Y | N | Y | N | N | Y | N | Y | N | N | N | X | X | X | X | TS < TN, iN <= iS + M, TS < W, TN >= W, WZ(1)=0 |
| | | 0 | 1 | 2 | 3 | 16 | 17 | 18 | 19 | 20 | 21 | 22 | 23 | 8 | 9 | 10 | 11 | 12 | 13 | 14 | 15 | |
| 50 | 23 | 1 | 0 | 0 | 1 | N | Y | N | Y | N | N | N | Y | Y | N | N | N | X | X | X | X | TS < TN, iN > iS + M |
| | | 0 | 1 | 2 | 3 | 48 | 49 | 50 | 35 | 36 | 37 | 38 | 39 | 40 | 41 | 42 | 43 | 44 | 45 | 46 | 47 | |
| 53 | 50 | 0 | 1 | 1 | 1 | N | N | Y | N | N | N | N | Y | Y | N | N | N | X | X | X | X | TS < TN, iN <= iS + M, TS >= W |
| | | 0 | 1 | 2 | 3 | 48 | 49 | 50 | 51 | 52 | 53 | 38 | 39 | 40 | 41 | 42 | 43 | 44 | 45 | 46 | 47 | |
| 55 | 53 | 0 | 1 | 1 | 1 | N | N | Y | N | N | N | N | Y | Y | N | N | N | X | X | X | X | TS < TN, iN <= iS + M, TS >= W, iN = iS |

FIG. 5A

| New control | | | | | New bitmap | | | | | | | | | | | | | | | |
|---|---|---|---|---|---|---|---|---|---|---|---|---|---|---|---|---|---|---|---|---|
| TS | WZ | | | | | | | | | | | | | | | | | | | |
| | 0 | 1 | 2 | 3 | 0 | 1 | 2 | 3 | 4 | 5 | 6 | 7 | 8 | 9 | 10 | 11 | 12 | 13 | 14 | 15 |
| 3 | 0 | 1 | 1 | 1 | N | N | N | Y | X | X | X | X | X | X | X | X | X | X | X | X |
| | 0 | 1 | 2 | 3 | 0 | 1 | 2 | 3 | 4 | 5 | 6 | 7 | 8 | 9 | 10 | 11 | 12 | 13 | 14 | 15 |
| 6 | 0 | 0 | 1 | 1 | N | N | N | Y | N | N | Y | N | X | X | X | X | X | X | X | X |
| | 0 | 1 | 2 | 3 | 0 | 1 | 2 | 3 | 4 | 5 | 6 | 7 | 8 | 9 | 10 | 11 | 12 | 13 | 14 | 15 |
| 6 | 0 | 0 | 1 | 1 | N | Y | N | Y | N | N | Y | N | X | X | X | X | X | X | X | X |
| | 0 | 1 | 2 | 3 | 0 | 1 | 2 | 3 | 4 | 5 | 6 | 7 | 8 | 9 | 10 | 11 | 12 | 13 | 14 | 15 |
| 8 | 0 | 0 | 0 | 1 | N | Y | N | Y | N | N | Y | N | Y | N | N | N | X | X | X | X |
| | 0 | 1 | 2 | 3 | 16 | 17 | 18 | 19 | 20 | 21 | 22 | 23 | 8 | 9 | 10 | 11 | 12 | 13 | 14 | 15 |
| 23 | 1 | 0 | 0 | 1 | N | Y | N | Y | N | N | N | Y | Y | N | N | N | X | X | X | X |
| | 0 | 1 | 2 | 3 | 48 | 49 | 50 | 35 | 36 | 37 | 38 | 39 | 40 | 41 | 42 | 43 | 44 | 45 | 46 | 47 |
| 50 | 0 | 1 | 1 | 1 | N | N | Y | N | N | N | N | Y | Y | N | N | N | X | X | X | X |
| | 0 | 1 | 2 | 3 | 48 | 49 | 50 | 51 | 52 | 53 | 38 | 39 | 40 | 41 | 42 | 43 | 44 | 45 | 46 | 47 |
| 53 | 0 | 1 | 1 | 1 | N | N | Y | N | N | N | N | Y | Y | N | N | N | X | X | X | X |
| | 0 | 1 | 2 | 3 | 48 | 49 | 50 | 51 | 52 | 53 | 54 | 55 | 40 | 41 | 42 | 43 | 44 | 45 | 46 | 47 |
| 55 | 0 | 0 | 1 | 1 | N | N | Y | N | N | Y | N | Y | Y | N | N | N | X | X | X | X |

FIG. 5B

SEQUENTIAL EVENT TRACKER WITH LOOSE ACCESS ATOMICITY

CLAIM OF FOREIGN PRIORITY

The present application claims the benefit under 35 U.S.C. § 119(a-d) of Israel Patent Application No. 311,073, filed Feb. 25, 2024, which is incorporated by this reference herein.

TECHNICAL FIELD

At least one embodiment generally pertains to event tracking, and more specifically, but not exclusively, to a sequential event tracker with loose access atomicity.

BACKGROUND

In certain computing environments, a array is employed to manage tracking of events associated with a system or device of the computing environment. While many types of events are envisioned, one type used by way of example herein is tracking when unique network packets are received and whether that unique network packet was received previously. This type of event tracking is performed with Internet Protocol Security (IPsec) for anti-replay protection, which tracks whether particular encrypted packets themselves have already been received and does not process these packets to provide anti-replay protection.

Such an array may be instantiated in memory where sequential cells of the array hold one or more bits that indicate information associated with the tracked events. In some systems, the order of the cells can be the order of an expected order in time of the events, although events may arrive out-of-order, tracking of which may still be according to the expected order. Furthermore, a total number of events can be larger than the array and, in that case, only a particular number of most-recent events are tracked while older events are not tracked. In this way, a particular chronological order of the events may be tracked for purposes of taking some action, such as whether to forward received network packets, flush certain data from cache to memory, disassociate grouped sections of memory, perform a technical update, or the like, based on a status of the event(s), as the event(s) are tracked.

In some systems or devices, the events are tracked in cache to provide quick access and better performance of the tracking procedure. When the size of the array is large in order to effectively track a sufficient number of events, multiple cache lines may need to be accessed for each update to the array, which reduces the effectiveness and performance of event tracking. Tracking multiple types of events in parallel tends to degrade performance even more.

BRIEF DESCRIPTION OF DRAWINGS

Various embodiments in accordance with the present disclosure will be described with reference to the drawings, in which:

FIG. 5A is a graph illustrating an active window of a current array and current control values of the cache when particular new packets are received, as tracked over time using identifiers values (or sequence numbers) of the new packets according to some embodiments;

FIG. 5B is a graph related to that of FIG. 5A illustrating associated updates to both control values and cell values located at different cell index values of the active window of the array based on the identifiers (or sequence numbers) of the new packets according to some embodiments.

DETAILED DESCRIPTION

Figure 1:
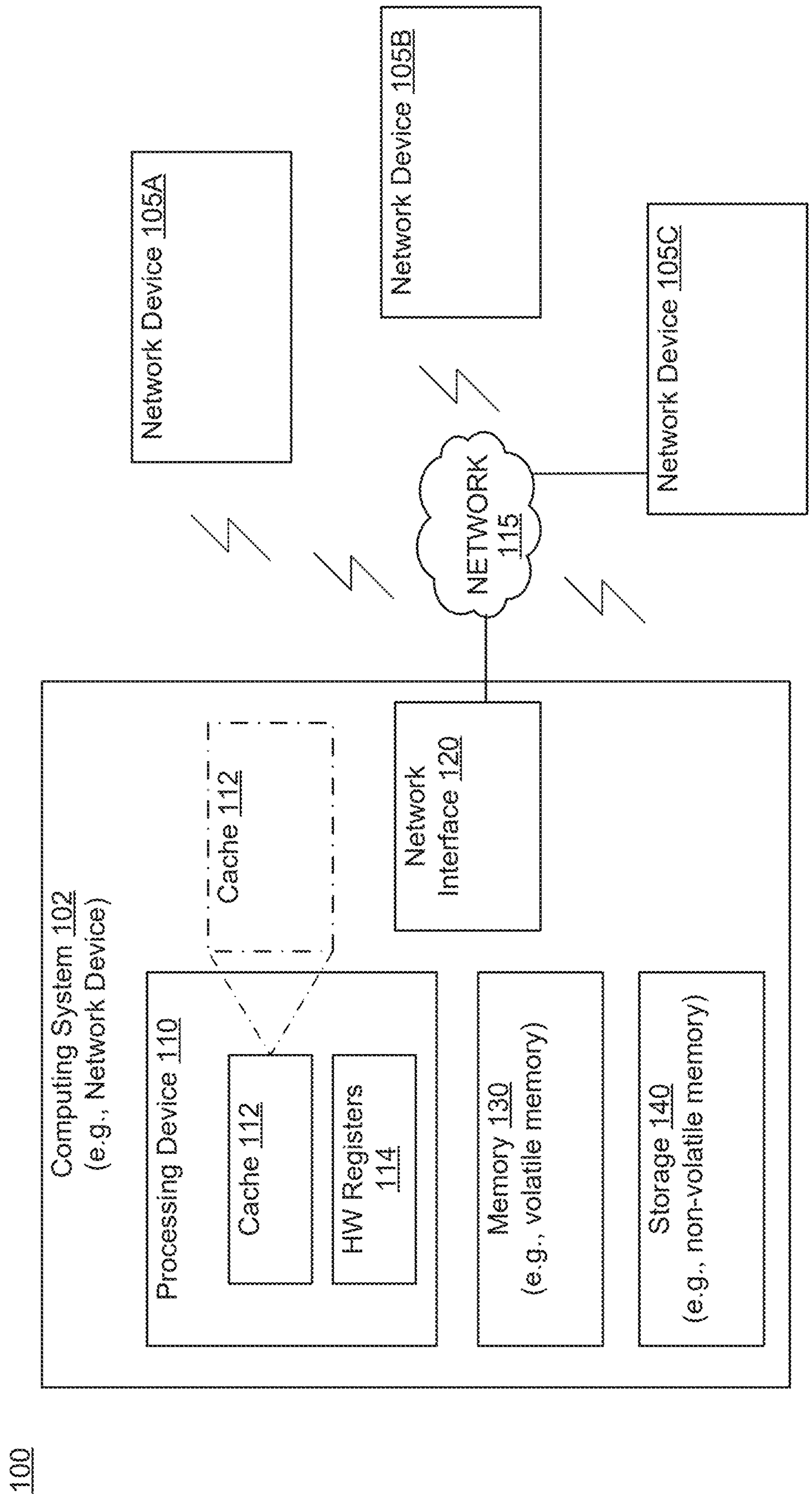
FIG. 1 is a block diagram of an example distributed system including a computing system and one or more network devices according to various embodiments.

As described above, present methods of event tracking employ an array that may be stored in cache (e.g., as a cache array) and tracked sequentially according to cache cells. In some applications of event tracking, the events are sequentially tracked within the cache cells according to an expected order, and sometimes, need to be updated atomically to adequately perform an expected action that the tracking might trigger (such as is the case in IPsec). For this reason, when offloading a sequential tracking operation to hardware for multiple types of events (each type tracked independently in a separate array), and the size of the hardware is limited, then the hardware may store numerous arrays in cache.

Further, assuming the size of the cache array needs to be larger than a cache line to provide tracking of a sufficient number of events, then multiple cache lines have to be accessed, read out, and updated. Sometimes, such updates can create a trickle-down effect (e.g., shifting of events across cache lines) in which many sequentially-ordered cache lines have to be read out and updated in order to properly (e.g., chronologically and/or atomically) track the events stored in the array. Such repetitive access, reading out, and updating of cache lines negatively impacts performance of a computing system or device in which too much cache is tied up and/or too many processing resources dedicated to updating the cache array just to track events. For example, in networked communication devices, the event tracking in such an array can reduce bandwidth or throughput capability.

Aspects and embodiments of the present disclosure address the above deficiencies and others by employing a cyclical sequential array in cache that tracks a certain number of events within a limited number of cache lines, and may do so through updating no more than two cache lines at a time. More specifically, a sliding window may be tracked through the cache array so only a limited number of cache lines need be considered for updating at any given time. Further, control values may be updated that correspond to a state of the cache lines of the array. In some embodiments, the control values are stored in a control cache line, which may be a second of the two cache lines at most that are updated. In some embodiments, each value (or state) of the control values may indicate whether a particular cache line should be initialized (or reset) before proceeding with making further updates for event tracking within that cache line. In this way, tracking may continue without slowing down to update certain cache lines that may be initialized or reset at a later time.

In some embodiments, a cache stores an array that tracks occurrence of multiple events, and a processing device is coupled to the cache. In some embodiments, the processing device tracks, within a control cache line of the cache or within other memory (as will be discussed), multiple control values corresponding to a state of multiple cache lines of the array, e.g., of a cache array implementing event tracking. The processing device may track, within the multiple cache lines of the array, a window of cell index values corresponding to event identifier values and having a window size that cyclically moves with an occurrence of any event that is positioned beyond the window. In some embodiments, a sequence number of the event is greater than the largest sequence number within the current window, and is thus positioned beyond the window.

In response to detecting an event, the processing device may update a value of a particular cache line of the multiple cache lines based on a control value that corresponds to the particular cache line and on whether the value is located within a range of cell index values currently defined by the window. In some embodiments, values within the multiple cache lines include indicators corresponding to unique network packets received over a network, such as is performed in providing anti-replay protection in IPSec. In some embodiments, at most the control values and a single cache line of the array are accessed in response to receipt of any given event or network packet (e.g., two total cache lines or a single cache line and some other memory location that stores the control values).

Therefore, advantages of systems, devices, and methods implemented in accordance with some embodiments of the present disclosure include, but are not limited to, providing an efficient mechanism to manage sequential event tracking with a size beyond that of a single cache line of a system or device in which the array is implemented for event tracking. Additional advantages include being able to increase available bandwidth and resources in communication devices by freeing up those consumed by event tracking. Other advantages will be apparent to those skilled in the art of this event tracking in hardware, as will be discussed hereinafter.

FIG. 1 is a block diagram of an example distributed system 100 including a computing system and one or more network devices according to various embodiments. In some embodiments, the system 100 includes the computing system 102, which communicates with multiple additional network devices over a network 115. In some embodiments, the network devices include a first network device 105A, a second network device 105B, and so forth through to an Nth network device 105N. The network 115 may be a wireless network, a wired network, or a combination of a wired and wireless network.

In various embodiments, the computing system 102 includes a processing device 110 that includes and/or is coupled to cache 112 and optionally includes hardware registers 114, a memory 130 (such as volatile memory), storage 140 (such as non-volatile memory), and a network interface 120. In some embodiments, the memory 130 and/or the storage 140 stores instructions (e.g., program code), which when executed by the processing device 110, perform the operations disclosed herein. In some embodiments, the network interface 120 is adapted to communicate with the additional network devices and pass packets to the processing device 110 for processing. In at least some embodiments, the processing device 110 stores metadata, accesses, and updates the metadata to update event tracking such as stored in a cache array of the cache 112, referred to herein after as "array" for simplicity.

In some embodiments, the array stores a cyclical sequential array that tracks multiple events (W) in time, where some cell $c_S$ (in $[0, \ldots, W-1]$ in the array) holds information about the most recent event that was processed, and each event is stored in the array using a particular number of bits (e.g., E-bits). The remaining tracked events may be cyclically ordered in the remaining cells of the array. When tracking events that arrive out-of-order, some unique and increasing event identifier (e.g., T) may be used to specify the order of an event in time (e.g., the actual time, sequence number, and the like).

In at least some embodiments, tracking and updating the array may be performed within a window of cell index values that cyclically moves with an occurrence of any event that is positioned beyond the window. Table 1 lists a number of variables that may be employed in an algorithm executable by the processing device 110 in order to track incoming events, regardless of whether the events arrive out of order, update a cell associated with an incoming event, and decide whether to cyclically move the window based on whether the cell is located beyond the window, e.g., has an event identifier that is greater than the largest event identifier value of the current window. If the window is shifted, then different variables may be reset to then be able to continue tracking a newly defined window of cell index values. The sequence numbers may be understood to be event identifiers. Further, if each cell of the array stores a single bit per event, then the number of bits to describe the size of the cache line is the same as the number of tracked events per cache line, e.g., P=L.

TABLE 1

| Variable | Definition |
|---|---|
| W | number of events in active window being tracked within array |
| $T_S$ | value of a highest sequence number/identifier from already received events |
| $T_N$ | value of a sequence number/identifier of a new event |
| $c_S$ | cell index location within a particular cache line corresponding to $T_S$ |
| $c_N$ | cell index location within a particular cache line corresponding to $T_N$ |
| P | number of bits to describe the size of a cache line |
| E | number of bits used to express a single event |
| M | number of cache lines needed for the array = ceil(W*E/P) |
| L | number of tracked events per cache line = floor(P/E) |

Thus, using Table 1, the processing device 110 may execute the algorithm to determine a value for event identifier $T_N$ of the new event (e.g., the "event") upon arrival and compare $T_N$ to a value for event identifier $T_S$, which is related to $c_S$, and the total number of tracked events in the window (or W). In some embodiments, if the event identifier $T_N$ for the event is less than event identifier $T_S$ minus W plus one (e.g., $T_N<T_S-W+1$), then the new event is handled as an out-of-array event since it is too old for the array. Otherwise, if the event identifier $T_N$ for the event is less than or equal to $T_S$ (e.g., $T_N<=T_S$), then the event is handled as an in-array event and its related information is updated in some cell $c_N$, which can be calculated with the parameters $T_N$, $T_S$, $c_S$, W, L, as will be discussed in more detail. Further, if $T_N>T_S$, then the cells between $c_S$ and $c_N$ are initialized in a cyclic manner. By treating the event tracker as a cyclic array of events stored in the cache 112, expensive shift operations can be avoided in disclosed embodiments.

For example, the purpose of anti-replay protection in IPSec is to ignore (e.g., drop) incoming old packets and incoming duplicated packets that arrive within some distance (measured in the difference in IPSec packet sequence number) from the highest sequence number of a packet that arrived and was successfully processed (e.g., decrypted and authenticated). To that end, the disclosed cyclic algorithm, in the context of anti-replay protection in IPSec, may include an array of size W that holds a single bit per packet, which is sufficient to indicate whether a packet with the relevant sequence number was already processed. In this example, values within the multiple cache lines of the array may include indicators corresponding to unique network packets received over the network 115 from other network devices. The identifier $T_S$ may be the highest sequence number (event identifier) of a packet that was successfully processed. The location of the identifier $T_S$ in the array (of the cache 112) may be determined as $c_S=T_S$ % L, e.g., $T_S$ modulo L, which is the number of tracked packets in a cache line. Thus, when L is a power of two, the calculation of $c_S$ may be straightforwardly performed in hardware. The sequence number of the other cells in the array may be implicitly determined by distance of these respective cells in the array from $c_S$.

Figure 2A:
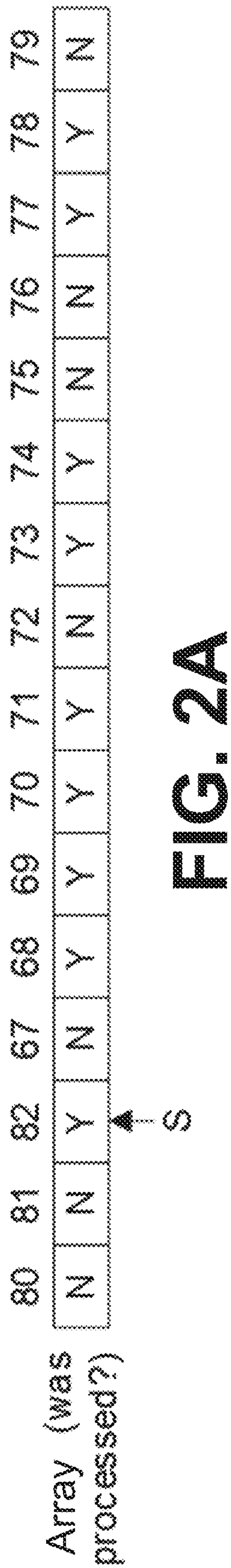
FIG. 2A, FIG. 2B, and FIG. 2C are graphical illustrations depicting an example set of cache lines that make up a window of cell index values of an array used to track IPSec-related events according to various embodiments.
Figure 2B:
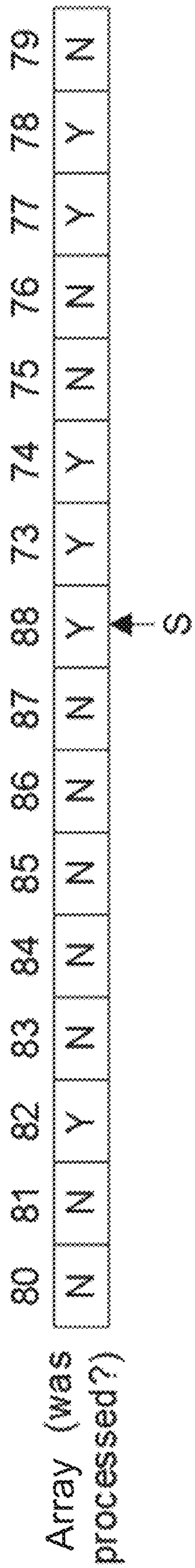
Figure 2C:
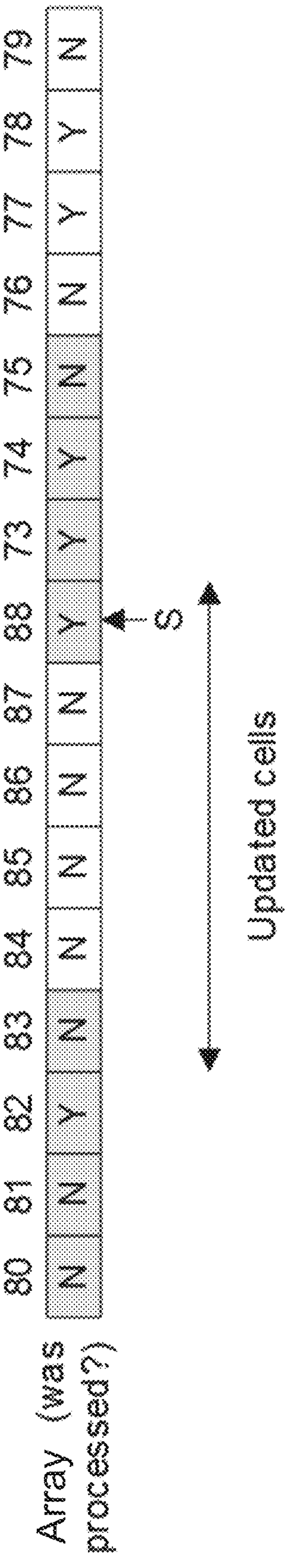

FIG. 2A, FIG. 2B, and FIG. 2C are graphical illustrations depicting an example set of cache lines that make up a window of cell index values of an array used to track IPSec-related events according to various embodiments, e.g., an array located in the cache 112. For example, consider $T_s$=82 (marked by a large "S" in FIG. 2A), and W=16, then $c_S$=2, cell index one ("1") holds the "processed" indication on sequence number 81, cell index zero ("0") holds that indication for sequence number 80, and cyclically, cell index 15 holds that indication for a packet with sequence number 79, and so forth. In this example embodiment, an indication of "N" (or not processed) may be stored as a zero ("0") whereas an indication of "Y" (or yes processed) may be stored as a one ("1").

To complete the example, considering the state of the array in FIG. 2A, when a new packet with sequence number $T_N$ is received, then if $T_N$<67, then the packet would be dropped since $T_N<T_S-W+1$. If, however, $T_N$=75, then the packet would be processed and the value of the array at $c_N$=11 would change to Y. If $T_N$=68, then the packet would be dropped since the array indicates that it was already processed since the value of $c_N$=4 is "Y." If, however, $T_N$=88, then $T_S$ would be updated to hold the value 88 and the array would be updated to indicate the new state, as depicted by the "S" location in FIG. 2B.

In cases where the size of the array times the number of bits per event tracked (e.g., W*E) is larger than the size of a cache line (e.g., P), then maintaining the array extends beyond a single cache line and requires additional resources so that in total M-ceil (W*E/P) cache lines are required with L=floor (P/E) tracked events (cells) per cache line. Here, the term "ceil" refers to a ceiling function that maps its argument to the smallest integer that is greater than or equal to its argument while the term "floor" refers to a floor function that maps its argument to the greatest integer less than or equal to its argument. Consider that there might be additional control bits for the array such as $\log_2(T_S)$ to store the largest event identifier associated with the array. In various embodiments, handling these resources is performed carefully and atomically to ensure consistency.

For example, when offloading a network security protocol such as IPSec, where the processing device 110 performs replay protection to prevent processing of duplicate packets, a sliding window may be implemented sequentially within the array. In that case atomicity prevents false-positives and false-negatives, e.g., drops a packet that was not yet received or passes a packet that was already processed, respectively.

In systems that support receiving out-of-order packets, where latency can result in large distance (in sequence numbers) between received packets, a small sliding window may result in dropping packets and reduce overall bandwidth by requiring retransmission for reliable connections. Furthermore, when the system 100 is required to support a large-scale of connections, accessing cache lines causes constrained bandwidth. Reducing accesses to such cache lines frees computation resources and optimizes system performance.

In systems that support a sequential event tracker for which W*E is larger than the size of cache line (e.g., P), the processing device 110 may need to allocate more than a single cache line to hold the array. A straightforward approach may be to allocate the required cache lines and maintain the same simple algorithm, and in addition, maintain a flow that updates all cache lines atomically so that no errors occur. As previously described, atomicity is fundamental in order to avoid consistency errors. However, in some cases such approach would establish a requirement to access all cache lines for every event and will reduce system performance severely. For example, when processing an event for which $T_N-T_S$ is approximately W, then all cache lines must be updated, which is undoubtedly inefficient.

As a further example, to simplify the example array implementation of FIGS. 2A-2B, assume that a cache line can hold 4 bits (P=4). In the situation where the received IPSec packet has a sequence number of $T_S$=88, then three cache lines would have been updated since the algorithm updates cells 3-8 of the array.

The present disclosure describes an alternative approach in which the processing device 110 stores additional control indicators in a separate storage location, so that, for each processed event, the processing device 110, at most, sequentially updates the control values and only one cache line instead of accessing several cache lines. In some embodiments, the control values are stored in a control cache line of the cache 112, in the hardware registers 114, in software registers or other locations of the memory 130, or the like. Accessing so few cache lines may be possible because, instead of initializing cache lines explicitly, the processing device 110 stores a single-bit indication per cache line (e.g., as a control value) indicating whether the cache line is already initialized or not to avoid fetching these cache line(s) if the cache line(s) are to be initialized.

Figure 3:
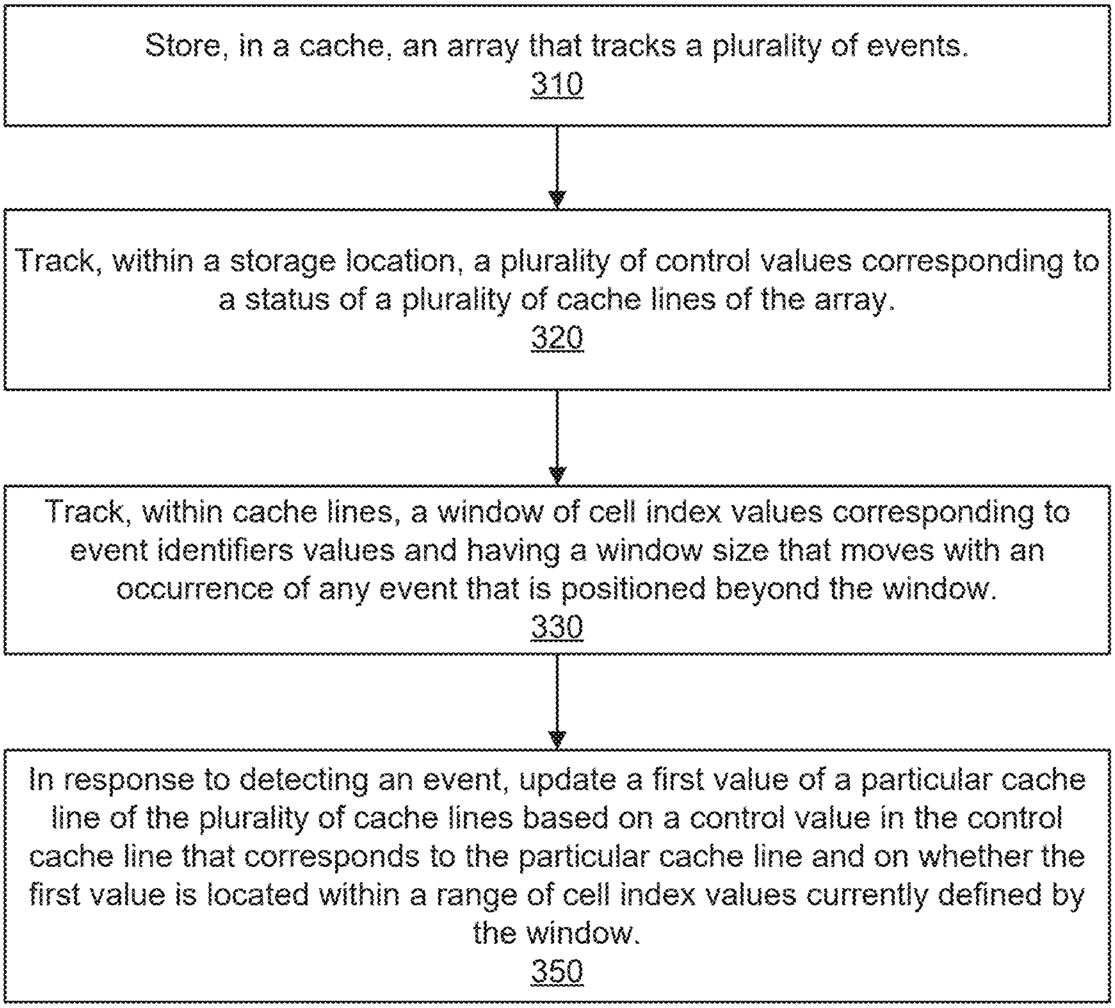
FIG. 3 is a flow chart of an example method for efficiently employing control values and multiple cache lines of an array in cache to track events according to at least one embodiment.

For this purpose, assume that the additional control bits and an event-tracking array are stored in distinct cache lines, although a separate cache line is not obligatory, as the control values or bits may be stored in registers or other memory locations. In this way, the number of cache lines that are accessed per packet can be limited to the control values stored in cache or other storage location and a single cache line that holds a part of the array. The discussion with reference to FIGS. 4A-4C will present such an example, of which FIG. 3 is disclosed with a particular set of operations. In at least some embodiments, access to the control values and to the cache line of the event-tracking array are performed atomically, or at least ensured that the order of access to each cache line follows the order of the received events. Thus, in at least some embodiments, two general stages of the disclosed algorithm include first accessing the control indicators or control values and updating the control indicator or value, if necessary. Based on updating the control value, second accessing a single cache line from the array and updating the array according to the original values of the control indicators.

FIG. 3 is a flow chart of an example method for efficiently employing control values and multiple cache lines of an array in cache to track events according to at least one embodiment. The method 300 may be performed by processing logic comprising hardware, firmware, software, or any combination thereof. In some embodiments, the method 300 is performed by the computing system 102, to include execution of instructions by the processing device 110 that are stored in storage 140 and executed out of the memory 130. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic stores, in a cache, an array that tracks multiple events. In some situations, these tracked events may number in the tens, hundreds, thousands, or hundreds of thousands.

At operation 320, the processing device tracks, within a storage location, multiple control values corresponding to a state of a plurality of cache lines of the array.

At operation 330, the processing device tracks, within the plurality of cache lines, a window of cell index values (e.g., corresponding to event identifier value of different events) having a window size that cyclically moves with an occurrence of any event that is positioned beyond the window.

At operation 340, the processing device, in response to detecting an event, updates a value of a particular cache line of the plurality of cache lines based on a control value in the control cache line that corresponds to the particular cache line and on whether the value is located within a range of cell index values currently defined by the window. For example, the value may be stored in a cell of the particular cache line that corresponds to a cell index value of the event.

Figure 4A:
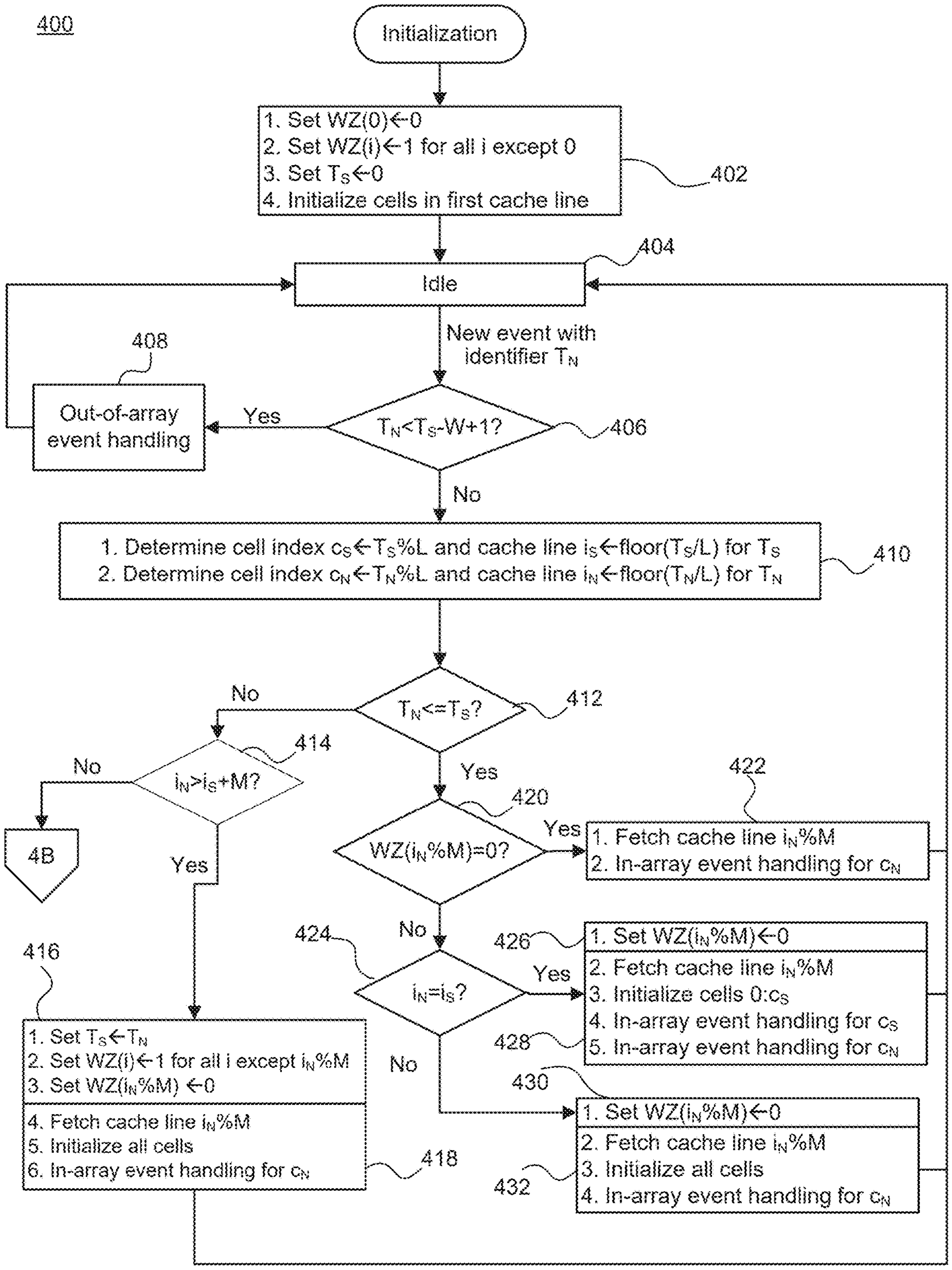
FIG. 4A, FIG. 4B, and FIG. 4C are flow charts of an example method for efficiently employing control values and multiple cache lines of an array in cache to track events according to at least some embodiments.
Figure 4B:
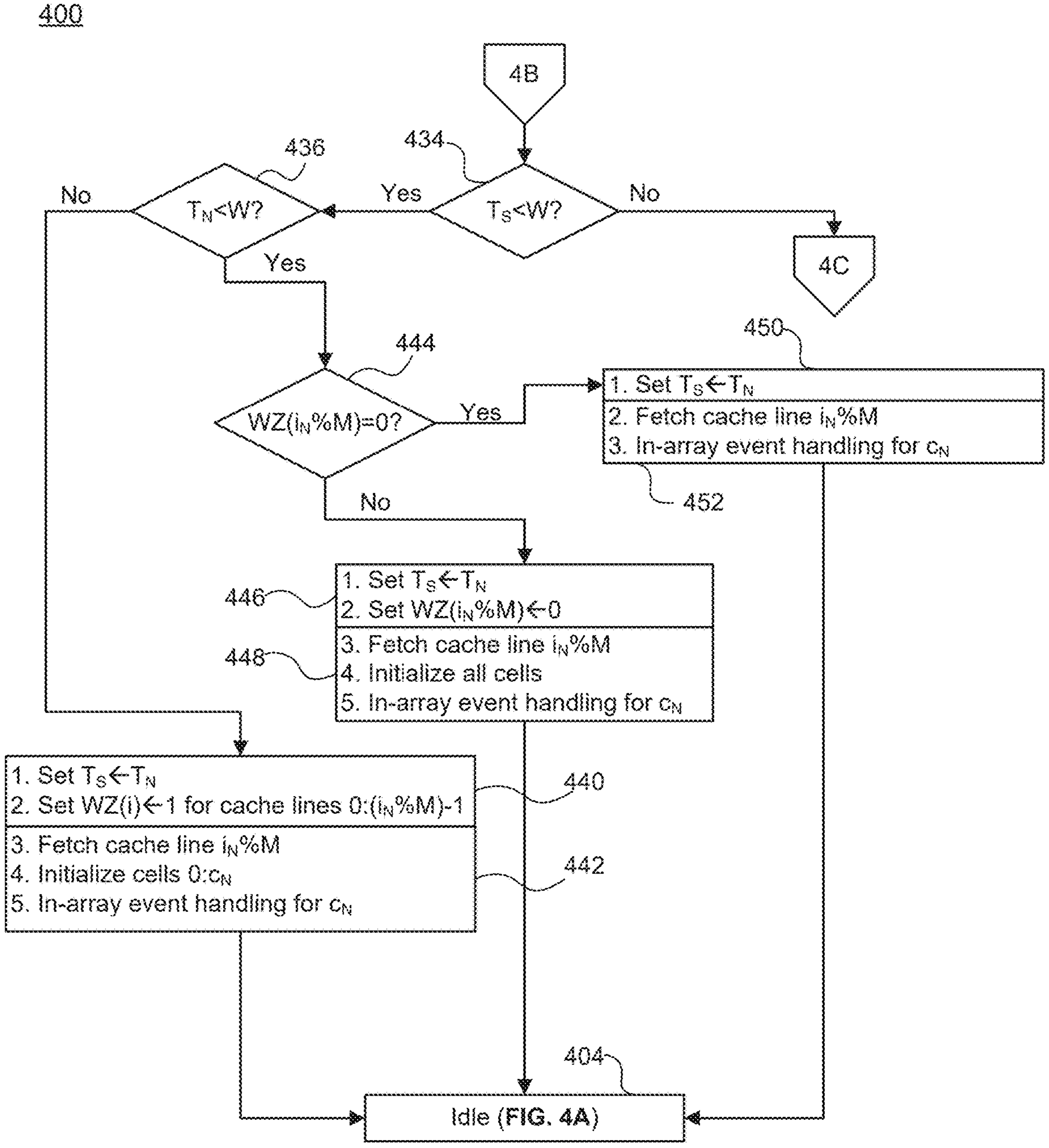
Figure 4C:
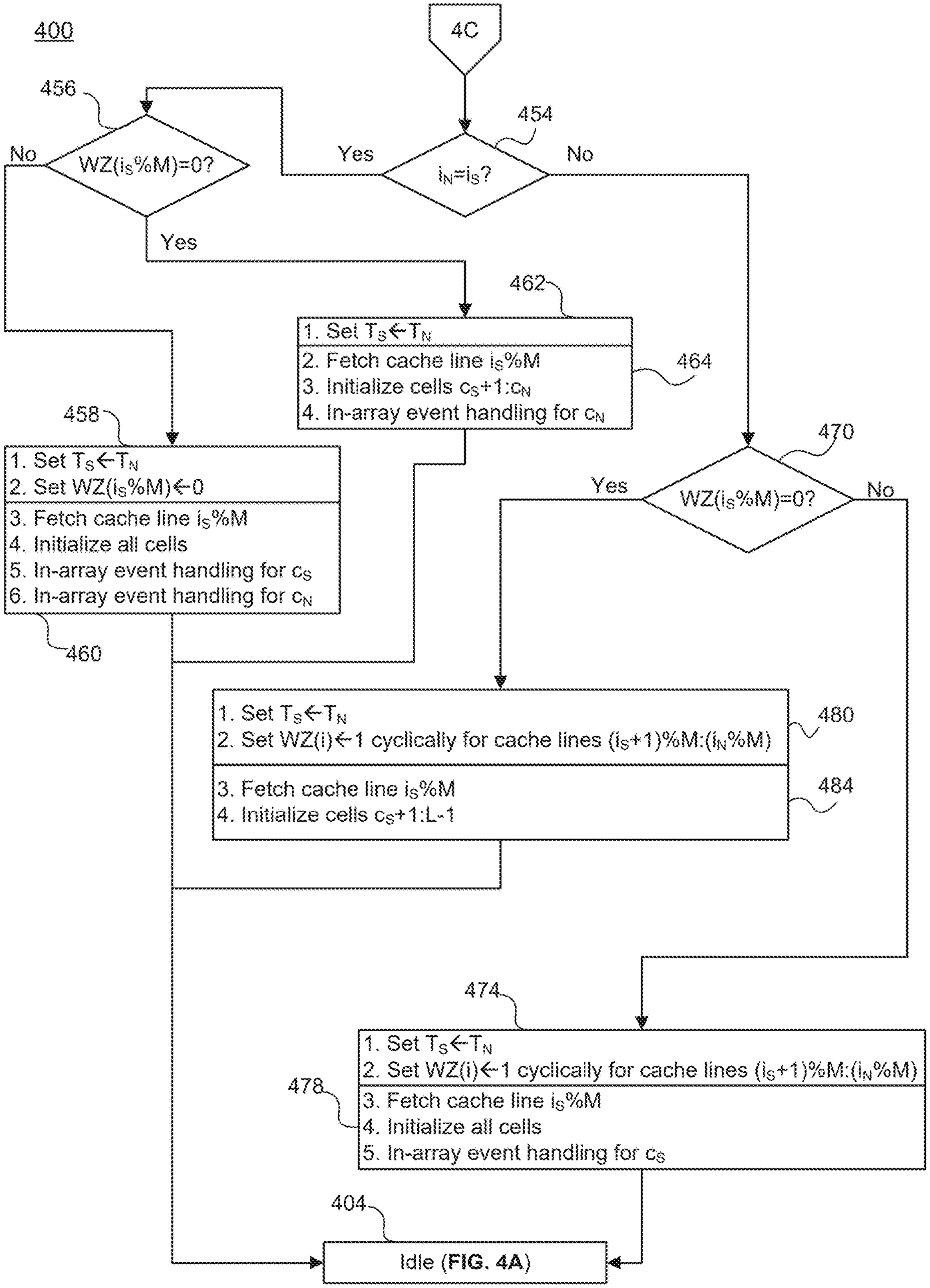

FIG. 4A, FIG. 4B, and FIG. 4C are flow charts of an example method 400 for efficiently employing control values and multiple cache lines of an array in cache to track events according to at least some embodiments. The method 400 may be performed by processing logic comprising hardware, firmware, software, or any combination thereof. In some embodiments, the method 400 is performed by the computing system 102, to include execution of instructions by the processing device 110 that are stored in storage 140 and executed out of the memory 130. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the method 400 can be understood to implement a large sequential event tracker where the event identifiers start at zero and increase by one for every subsequent in-order event. Other configuration values may also first be initialized, including a largest identifier of an event that was processed (denoted as $T_S$) in $\log_2(T_{MAX})$ bits. In some cases, $T_S$ can be optimized to be stored in fewer bits where, for example, there is an assumption on the maximum allowed out-of-orderness of the system, or in other words the maximal difference between packet identifier values ($T_S - T_N$) so that only a portion of the most-significant bits are stored. A further configuration value may include a per-cache line zero-indication (denoted as WZ), e.g., M-bits for a single-bit per cache line indicating whether the cache line should be zeroed or not before accessing and/or updating some cell in it. In some embodiments, these WZ (or control) values are stored in the control cache line of the cache 112 or in registers or other memory location.

At operation 402, the processing logic initializes certain values and parameters to be used for tracking events. For example, the processing logic deasserts an initial control value (e.g., associated with the particular cache line) and asserts a set of remaining control values of the plurality of control values (WZ(i)). The processing logic may then set a first event identifier value ($T_S$) that is a highest value for received events to an initial value, e.g. to zero, before starting to track any received events. In some embodiments, the control values indicate whether to initialize corresponding cache lines to which the control values refer. The processing logic may also initialize cells of the cache line associated with the initial control value and initialize cells of the particular cache line in response to the control value, which is associated with the particular cache line, being asserted.

At operation 404, the processing logic continues in an idle state in detecting a new event that is to trigger any number of different event-related update flows through the flow chart of FIGS. 4A-4C.

At operation 406, the processing logic determines the first event identifier value that is a highest value for already-processed events (tracked as $T_S$), determines a second event identifier value for the event (tracked as $T_N$), and compares the first event identifier value to the second event identifier value. For example, the processing logic may determine whether the second event identifier value is less than a difference between the first event identifier value and a size of the window plus one. Thus, operation 406 assumes new events are being received with the rest of the time being idle at operation 404. In general, unless otherwise specified, the rest of the method flow discussion below is directed at a single new "event" to keep the discussion straight-forward, but many different events may take different paths through the operations of method 400, as is illustrated best with reference to FIGS. 5A-5B, which illustrates specific events, as sequentially received, by way of example.

At operation 408, in response to the second event identifier value meeting a condition that is based on the first event identifier value and the window size (e.g., being less than a difference between the first event identifier value and a size of the window plus one), the processing logic performs out-of-array event handling for the event. This out-of-array event handling may be algorithm dependent, e.g., dropping a packet in IPSec, managing a limited list of recent events that were located outside of the array, and the like. Operation 408 may also be understood as, in response to the second event identifier value being too small to be tracked by the window, perform out-of-array event handling for the event.

At operation 410, the processing logic determines a first cell index value ($c_S$) as a combination of the first event identifier value ($T_S$) and a number of possible tracked events (L) for each of the plurality of cache lines. In some embodiments, the first cell index value is $T_S$ modulo L ($T_S$ % L) or other operation between $T_S$ and L. The processing logic may also determine an initial cache line value ($i_S$) of the plurality of cache lines, which is associated with the first event identifier value, e.g., floor ($T_S$/L). The processing logic may also determine a second cell index value ($c_N$) as a combination of the second event identifier value ($T_N$) and the number of possible tracked events (L) for each of the plurality of cache lines. In some embodiments, the second cell index value is $T_N$ modulo L ($T_N$ % L) or other operation between $T_N$ and L. The processing logic may further determine a second cache line value in of the plurality of cache lines, which is associated with the second event identifier value, e.g., floor ($T_N$/L).

At operation 412, the processing logic determines whether the second event identifier value TN is less than or equal to the first event identifier value TS, e.g., whether the event is outside of the window.

At operation 414, in response to the second event identifier value being beyond the window (e.g., being greater than the first event identifier value), the processing logic further determines whether a second cache line value ($i_N$) of the array for the event meets a condition that is based on a first cache line value, which is associated with the first event identifier value, and a number of the plurality of cache lines of the array. For example, the processing logic can determine whether the second cache line value is greater than addition of a first cache line value ($i_S$), which is associated with the first event identifier value ($T_S$), and a number of the plurality of cache lines of the array (M). In other words, the processing logic determines whether second event identifier value is so large that there is no overlap between the currently tracked events by the window and the events that are tracked by the window after the event is processed. If the answer is no at operation 414, e.g., determining that a second cache line value of the array for the event is less than or equal to addition of a first cache line value, which is associated with the first event identifier value, and a number of the plurality of cache lines of the array, then the method 400 proceeds to operations of FIG. 4B. Otherwise, the method 400 proceeds to operations 416 and 418 to reset the array for a new window. In some embodiments, operations after certain conditions are met are performed in two parts, first associated with updating the value of $T_S$ and/or value(s) of WZ(i), or the control values, and second associated with updating cache lines in the array that make up the specific event-tracking operation.

At operation 416, the processing logic makes the first event identifier value ($T_S$) equal to the second event identifier value ($T_N$) and asserts control values of the control cache line except for the control value associated with the current event. Further, the processing logic deasserts the control value in the control cache line for the particular event, e.g., sets the control value to a predetermined value such as zero.

At operation 418, the processing logic accesses (e.g., fetches) a particular cache line having a cell index value corresponding to the event, e.g., which can be determined as $i_N$ % M in some embodiments. The processing logic may also initialize the cells of the particular cache line and perform in-array handling, within the particular cache line, for the second cell index value ($c_N$) associated with the second event identifier value of the event. In some embodiments, in-array handling is algorithm dependent. For example, in-array handling can include checking whether a packet with sequence number $T_N$ is a duplicate (like the anti-replay protection algorithm in IPsec), counting the number of times an event has arrived, and the like.

At operation 420, in response to, at operation 412, the second event identifier value meeting a condition that is based on the first event identifier value and the window size (e.g., the second event identifier value being less than or equal to the first event identifier value), the processing logic determines whether the control value for the event (WZ($I_N$ % M)) is asserted. While asserted could mean has a value of zero or one, for purposes of explaining the method 400, "asserted" means set to one ("1"). If the control value is asserted, the method 400 proceeds to operation 424 and if the control is not asserted (e.g., unasserted), the method 400 proceeds to operation 422.

At operation 422, in response to the control value being unasserted, the processing logic accesses the particular cache line and performs in-array event handling for a cell index value of the particular cache line ($c_N$) corresponding to the second event identifier value.

At operation 424, the processing logic determines whether a first cache line value, associated with the first event identifier value, matches that of the particular cache line, e.g., whether in equals is. For example, at operation 424, the processing logic may determine whether the first and second event identifier values are tracked in the same particular cache line of the plurality of cache lines of the array. If the answer is yes, the method 400 proceeds to operations 426 and 428; else the method 400 proceeds to operations 430 and 432 if the first and second event identifier values are tracked in different cache lines of the plurality of cache lines.

At operation 426, the processing logic deasserts the control value in the control cache line, e.g., sets the control value to zero.

At operation 428, the processing logic accesses the cache line (e.g., at $i_N$ % M) and initializes cells of the particular cache line from zero up to a first cell index value associated with the first event identifier value (e.g., 0:$c_S$). The processing logic further performs in-array handling, within the particular cache line, for the first cell index value ($c_S$) followed by performing in-array handling, within the particular cache line, for a second cell index value ($c_N$) associated with the second event identifier value.

At operation 430, the processing logic deasserts the control value in the control cache line, e.g., sets the control value to zero.

At operation 432, the processing logic accesses the cache line (e.g., at $i_N$ % M) and initializes the cells of the particular cache line. The processing logic further performs in-array handling, within the particular cache line, for a second cell index value ($c_N$) associated with the second event identifier value.

With additional reference to FIG. 4B, as discussed, if the determination at operation 414 is "No," the method 400 proceeds to operation 434. At operation 434, the processing logic determines whether it is still at the beginning of tracking of events, for example, if the first event identifier value ($T_S$) is less than the size of the event tracking window (W). If the answer is no at operation 434, the method 400 proceeds to the operations of FIG. 4C. If, however, the answer is yes at operation 434, the method 400 proceeds to operation 436, where the processing logic determines whether the second event identifier value ($T_N$) is less than the size of the event tracking window (W). Thus, between operations 434 and 436, the processing logic may determine whether each of the first event identifier value and the second event identifier value meet a condition that is based on window size. If the answer is no at operation 436, the method 400 proceeds to operations 440 and 442.

At operation 440, the processing logic, in response to determining that the second event identifier value is greater than or equal to the size of the event tracking window (W), makes the first event identifier value ($T_S$) equal to the second event identifier value ($T_N$). The processing logic may then assert the control values for the plurality of cache lines from zero up to one less than the particular cache line, e.g., up to $i_N$ % M minus one.

At operation 442, the processing logic accesses the cache line associated with the event, e.g., at $i_N$ % M. The processing logic may initialize the cells of particular cache line from zero up to a second cell index value associated with the second event identifier value, e.g., 0:$c_N$. The processing logic may then perform in-array handling, within the particular cache line, for the second cell index value ($c_N$) associated with the second event identifier value of the event.

If the answer at operation 436 is yes, the method proceeds to operation 444, where the processing logic determines whether the control value of the particular cache line is asserted (e.g., WZ ($I_N$ % M) is equal to one). If the control value is asserted, the method 400 proceeds to operations 446 and 448, and if the control value is unasserted, the method 400 proceeds to operations 450 and 452.

At operation 446, the processing logic makes the first event identifier value equal to the second event identifier value and deasserts the control value for the particular cache line.

At operation 448, the processing logic accesses the particular cache line (e.g., at $i_N$ % M) and initialize the cells of the particular cache line. The processing logic then performs in-array handling, within the particular cache line, for a second cell index value ($c_N$) associated with the second event identifier value of the event.

At operation 450, the processing logic makes the first event identifier value equal to the second event identifier value.

At operation 452, the processing logic accesses the particular cache line (e.g., at $i_N$ % M) and initialize the cells of the particular cache line. The processing logic then performs in-array handling, within the particular cache line, for a second cell index value ($c_N$) associated with the second event identifier value of the event.

With additional reference to FIG. 4C, as was discussed, if the answer at operation 434 is "No," the method 400 proceeds to operation 454, where the processing logic determines whether a first cache line value ($i_S$), associated with the first event identifier, matches that of the particular cache line ($I_N$). For example, at operation 454, the processing logic may determine whether the first and second event identifier values are tracked in the same particular cache line of the plurality of cache lines of the array. If the answer at operation 454 is yes, the method 400 proceeds to operation 456; else the method 400 proceeds to operation 470 if the first and second event identifier values are tracked in different cache lines of the plurality of cache lines.

At operation 456, the processing logic determines whether the control value for the particular cache line is deasserted, e.g., has a zero value. At operation 456 and operations stemmed from operation 456, the particular cache line is the same as the first cache line.

At operation 458, in response to the control value for the particular cache line being asserted (at operation 456), the processing logic makes the first event identifier value equal to the second event identifier value and deasserts the control value for the particular cache line.

At operation 460, the processing logic accesses the particular cache line, e.g., at $i_S$ % M and initializes the cells of the particular cache line. The processing logic may then perform in-array handling, within the particular cache line, for a first cell index value associated with the first event identifier value followed by performing in-array handling, within the particular cache line, for a second cell index value associated with the second event identifier value.

At operation 462, in response to the control value for the particular cache line being deasserted (at operation 456), the processing logic makes the first event identifier value equal to the second event identifier value.

At operation 464, the processing logic accesses the particular cache line, e.g., at $i_S$ % M and initializes the cells of the particular cache line from a first cell index value associated with the first event identifier value plus one up to a second cell index value associated with the second event identifier value, e.g., $c_S$+1:$c_N$. In other words, the processing logic may initialize cells within an initial cache line associated with the initial cache line value from beyond a first cell index value associated with the first event identifier value up to a last cell of the initial cache line. The processing logic may further perform in-array event handling, within the particular cache line, for the second cell index value associated with the second event identifier value of the event.

At operation 470 (arrived at from a negative determination at operation 454), the processing logic determines whether the control value for the particular cache line is asserted. At operation 470 and operations stemming from operation 470, the particular cache line is different from the first cache line.

At operation 474, in response to the particular cache line being asserted (at operation 470), the processing logic makes the first event identifier value equal to the second event identifier value. The processing logic may further assert the control values, cyclically, within the control cache line corresponding to one greater than an initial cache line value associated with the first event identifier value and sequential cache line values of the plurality of cache lines up to a final cache line value associated with the second event identifier value of the event, e.g., ($i_S$+1) % M:($i_N$ % M).

At operation 478, the processing logic the processing logic accesses the particular cache line, e.g., at $i_S$ % M and initializes the cells for an initial cache line corresponding to the initial cache line value. The processing logic performs in-array handling, within the initial cache line, for a first cell index value associated with the first event identifier value.

At operation 480, in response to the particular cache line being deasserted (at operation 470), the processing logic makes the first event identifier value equal to the second event identifier value. The processing logic may further assert the control values, cyclically, within the control cache line corresponding to one greater than an initial cache line value associated with the first event identifier value and sequential cache line values of the plurality of cache lines up to a final cache line value associated with the second event identifier value of the event, e.g., ($i_S$+1) % M:($i_N$ % M).

At operation 484, the processing logic accesses the particular cache line, e.g., at $i_S$ % M and initializes cells within an initial cache line corresponding to the initial cache line value from one greater than a first cell index value associated with the first event identifier value up to an end of the initial cache line, e.g., $c_S$+1:L−1.

FIG. 5A is a graph illustrating an active window of a current array and current control values of the cache when particular new packets are received, as tracked over time using identifier values (or sequence numbers) of the new packets according to some embodiments. FIG. 5B is a graph related to that of FIG. 5A illustrating associated updates to both control values of the control cache line and cell values located at different cell index values of the active window of the array based on the identifiers (or sequence numbers) of the new packets according to some embodiments. While the example of FIGS. 5A-5B are illustrated for packets, e.g., for use in IPsec implementation of anti-replay protection where a single bit is required per cell in the array, one of ordinary skill in the art would appreciate extension of the application of this cyclical array tracking to other applications and fields.

As can be observed, the example of FIGS. 5A-5B employs an array of four cache lines, each cache line including four cell positions that can be updated to track events. Actual implementations in practice may be much bigger, but this size is used for explanatory purposes in this disclosure, and therefore is merely exemplary. Table 1 may again be helpful to understand what variables are being referred to and their respective definitions.

In various embodiments, for each new packet with a sequence number or identifier ($T_N$) in relation to a current $T_S$ value (initialized to zero), FIG. 5A illustrates the values in the current array and current control cache line before arrival of each new packet. FIG. 5B, on the other hand, illustrates how the array changes (e.g., to become a "New Array") based on algorithmic-generated changes based on the new packet. The new array becomes the "Current Array" in FIG. 5A before the next new packet arrives, which causes additional updates again as the flow moves back and forth between FIG. 5A and FIG. 5B. The determination "Flow" illustrated at the right of the graph of FIG. 5A indicates relative values of many of the variables used by the algorithm of the method 400 of FIGS. 4A-4C, and thus will be helpful in determining how to apply the method 400 to the particular example of FIGS. 5A-5B.

In the illustrative embodiment, the first new packet to arrive has a sequence number ($T_N$) of three ("3"), the control values are initialized to one ("1"), and the current array values are initialized to "X," which means the algorithm does not care at this point what the values are, as these values will be updated based on incoming packet sequence numbers. Notice that as $T_S$<W, the cells to the right of the location of $T_S$ hold indications for higher sequence numbers than $T_S$. Cell indices generally do not change with events, as the cell indices remain from 0 to L−1 in each cache line. Thus, because this is early on in updating the array, the relative values of $T_S$, $T_N$, $i_N$, is, directs the flow into the operations of FIG. 4B. As illustrated in FIG. 5B, the cell index values are initialized (due to WZ(0) being equal to one) and the third cell (index 2) of the first cache line is updated to "Y" for yes to being received. Further, the control value for WZ(0) is updated to zero, e.g., is deasserted, to indicate that the first cache line has current/valid data and need not be first initialized. Finally, the first event identifier value ($T_S$) is set to the three, the incoming sequence number of the new packet. These are the current values before the next new packet is received. In some embodiments, the "N" value may be represented with a zero and a "Y" value represented with a one, but these values may also be reversed.

The second packet to be received has a sequence number of six ("6"), which is generally handled the same as was the packet having sequence number of three, as was just explained. But, the sequence number coincides with a cell index value in the second cache line, so the second cache line now has "N" values, except for the third cell in the second cache line (index 2), which has a "Y" value (see FIG. 5B). The control value for WZ(1) is updated to zero similar to what was done with the control value corresponding to the first cache line.

The third packet to be received has a sequence number of one ("1"), which is located in the first cache line. Since the control value WZ(0) for the first cache line is zero, the second cell (index 1) corresponding to the sequence number is updated to "Y," as illustrated in FIG. 5B. No other updates may be necessary for this third new packet.

The fourth new packet has a sequence number of eight ("8"), which is located in the third cache line. Thus, as illustrated in FIG. 5B, similar updates are made to the array and the control values as was made in response to receiving the packet with sequence number six, except with relation to the third cache line. More specifically, the third cache line is initialized to "N" values except for the first cell (index 0) coinciding with the sequence number for the new event is updated to "Y." Further, the control value for WZ(2) associated with the third cache line is set to zero as well.

The fifth next packet has a sequence number of 23, which puts the high sequence number such that the current TS is lower than W, e.g., $T_S$<W. Further, the new window is shifted to encompass sequence number 23 and $T_N$ is larger than W, e.g., $T_N$>W. Thus, this situation puts the decision-making at operations 440 and 442 of FIG. 4B. As illustrated in FIG. 5B, the window of cells has extended out to cell index values 8-23, and the sequence number 23 puts updates within the second cache line. Because the first cache line has invalid (stale) values for cells 16-19, the control value WZ(0) is reset to one, meaning the first cache line needs to be initialized at next update. Notice that the cells to the right of the $T_S$ were not zeroed since $T_S$<W. From now on, the cells to the right of $T_S$ will hold indications for smaller sequence numbers.

The sixth packet has a sequence number of 50, which means $T_S$<$T_N$, $I_N$> is +M, and putting the decisional flow at operations 416 and 418 in FIG. 4A. Thus, as illustrated in FIG. 5B, the window again cyclically shifts to higher sequence numbers to capture sequence number 50, now defined by values from 35-50. The value of $T_S$ becomes the value of $T_N$ and all the control values are set (e.g., initialized) to one except for WZ(0) for the cache line in which $T_N$ of 50 resides which is set to zero. The values of the first cache line are initialized to "N" and the bit value in the third cell (index 2) of the first cache line, corresponding to sequence number value 50, is set to "Y."

The seventh packet has a sequence of 53, which is higher than the previous sequence number of 50. This means that $T_S$<$T_N$, $I_N$<=$i_S$+M, and $T_S$>=W, putting the decisional flow at operations 474 and 478 in FIG. 4C. Since $T_S$>W, the algorithm causes an update to the cache line that holds $T_S$ (e.g., the first cache line) and cyclically shifts W to a higher range to capture sequence number 53, now defined by cell index values 38-53 (see FIG. 5B). In this case, the algorithm zeros the third cell in the first cache line since cell number three changes its indication from sequence number 35 to 51 which had not yet been received. Cell index three already had the value of "N," but the algorithm could not of have known, so the algorithm accesses cell index three and sets its value to "N." To avoid accessing a second cache line of the array, the algorithm sets WZ(1) to one ("1") despite WZ(1) already having that value.

The eighth (and final) packet for this example has a sequence of 55, which is a higher sequence number than the previous sequence number of 53. Also, $I_N$ is equal to is, so the algorithm can access the second cache line of the previous $T_S$, and follow operations 458 and 460 of FIG. 4C. As illustrated in FIG. 5B, the algorithm may then initialize the second cache line to "N" (or zero) values up to cell $c_N$ which is the fourth cell (index 3) of the second cache line, and update the second cell (index 1, for sequence number 53) then update the fourth cell (index 3 for sequence number 55), e.g., in-array handling for both $c_S$ and $c_N$. In this way, cache line accesses are minimized and updates for multiple incoming packets may be made to a single cache line at the same time. Further, the control value WZ(1) for the second cache line may be set to zero, indicating that the data is valid, and no initialization is first to be performed before accessing the second cache line.

Figure 6:
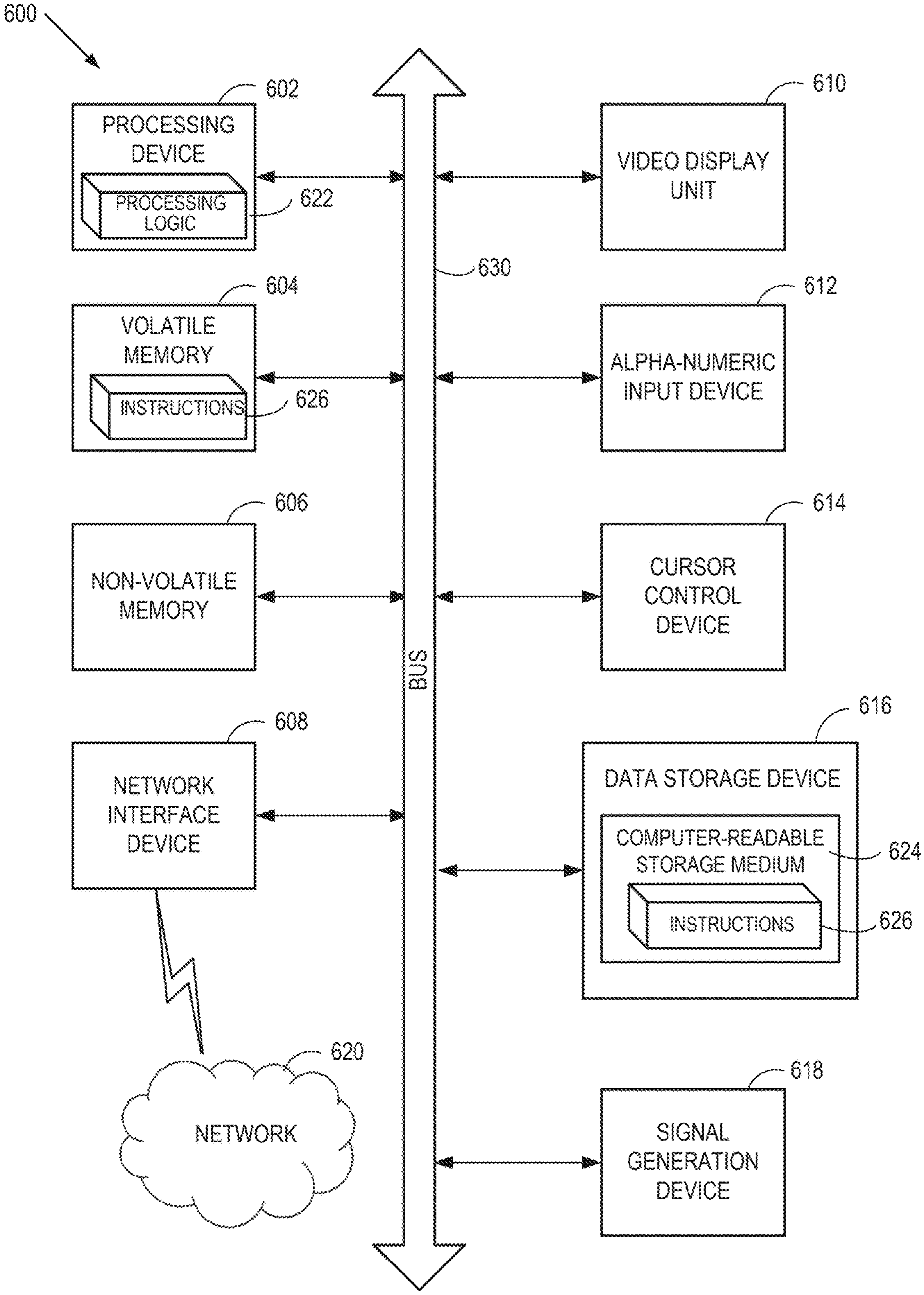
FIG. 6 illustrates a block diagram illustrating an exemplary computer device, in accordance with implementations of the present disclosure.

FIG. 6 illustrates a block diagram illustrating an exemplary computer device 600, in accordance with implementations of the present disclosure. Computer device 600 can correspond to the computing system 102 of distributed system 100 (FIG. 1). Example computer device 600 can be connected to other computer devices in a LAN, an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor, DPU, CPU, or GPU), a volatile memory 604 (or main memory, e.g., read-only memory (ROM), flash memory, dynamic random access memory (DRAM) such as synchronous DRAM (SDRAM), etc.), a non-volatile memory 606 (e.g., flash memory, static random access memory (SRAM), etc.), and a secondary memory (e.g., a data storage device 616), which can communicate with each other via a bus 630.

Processing device 602 (which can include processing logic 622) represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an ASIC, an FPGA, a digital signal processor (DSP), network processor, or the like. In accordance with one or more aspects of the present disclosure, processing device 602 can be configured to execute instructions performing method 300 for implementing out of band threat prevention.

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 618 (e.g., a speaker).

Data storage device 616 can include a computer-readable storage medium (or, more specifically, a non-transitory computer-readable storage medium) 624 on which is stored one or more sets of executable instructions 626. In accordance with one or more aspects of the present disclosure, executable instructions 626 can comprise executable instructions performing method 300 for implementing out of band threat prevention.

Executable instructions 626 can also reside, completely or at least partially, within volatile memory 604 and/or within processing device 602 during execution thereof by example computer device 600, volatile memory 604 and processing device 602 also constituting computer-readable storage media. Executable instructions 626 can further be transmitted or received over a network via network interface device 608.

While the computer-readable storage medium 624 is shown in FIG. 6 as a single medium, the term "computer-readable storage medium" or "non-transitory computer-readable storage medium storing instructions" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A device comprising:

a cache to store an array that tracks occurrence of a plurality of events; and a processing device coupled to the cache, the processing device to:

track a plurality of control values associated with a state of a plurality of cache lines of the array;

track, within the plurality of cache lines, a window of cell index values corresponding to event identifier values and having a window size that moves with an occurrence of any event that is positioned beyond the window; and in response to detecting an event, update a first value of a particular cache line of the plurality of cache lines based on a control value corresponding to the particular cache line and on whether the first value is located within a range of cell index values currently defined by the window.

2. The device of claim 1, wherein at most the plurality of control values and a single cache line of the array are accessed in response to receipt of any given event.

3. The device of claim 1, wherein values within the plurality of cache lines comprise indicators corresponding to unique network packets received over a network, and wherein at most the plurality of control values and a single cache line of the array are accessed in response to receipt of any given network packet.

4. The device of claim 3, wherein the window size is determined based on an expected maximal difference between packet identifier values of arriving packets.

5. The device of claim 1, wherein, to track the window of cell index values, the processing device is further to cyclically move the window in response to any event having a cell index value that is located beyond the window.

6. The device of claim 1, wherein the plurality of control values indicate whether to initialize corresponding cache lines, and wherein the processing device is further to:

deassert an initial control value;

assert a set of remaining control values of the plurality of control values;

set a first event identifier value that is a highest value for received events to an initial value before starting to track any received events;

initialize cells of the cache line associated with the initial control value; and initialize cells of the particular cache line in response to the control value, which is associated with the particular cache line, being asserted.

7. The device of claim 1, wherein the processing device is further to:

determine a first event identifier value that is a highest value for received events;

determine a second event identifier value for the event; and perform a comparison that is based on the first event identifier value and the second event identifier value.

8. The device of claim 7, wherein the processing device is further to, in response to the second event identifier value being too small to be tracked by the window, perform out-of-array event handling for the event.

9. The device of claim 7, wherein the processing device is further to, in response to the second event identifier value meeting a condition that is based on the first event identifier value and the window size, perform out-of-array event handling for the event.

10. The device of claim 7, wherein the processing device is further to:

determine a first cell index value as a combination of the first event identifier value and a number of possible tracked events for each of the plurality of cache lines;

determine a first cache line value of the plurality of cache lines as a combination of the first event identifier value and a number of possible tracked events for each of the plurality of cache lines, which is associated with the first event identifier value;

determine a second cell index value as a combination of the second event identifier value and the number of possible tracked events for each of the plurality of cache lines; and determine a second cache line value of the plurality of cache lines as a combination of the second event identifier value and the number of possible tracked events for each of the plurality of cache lines, which is associated with the second event identifier value.

11. The device of claim 7, wherein the processing device is further to, in response to the second event identifier value being within the window:

determine a state of the control value; and initialize some cells of the particular cache line depending on the state; and perform in-array handling, within the particular cache line, for a cell index value associated with at least one of the first event identifier value or the second event identifier value.

12. The device of claim 11, wherein the processing device is further to, in response to the second event identifier value meeting a condition that is based on the first event identifier value and the window size:

determine that the control value associated with the particular cache line is deasserted; and perform in-array event handling for a second cell index value of the particular cache line associated with the second event identifier value.

13. The device of claim 11, wherein the processing device is further to, in response to the second event identifier value meeting a condition that is based on the first event identifier value and the window size:

determine that the control value is asserted;

determine that the first and second event identifier values are tracked in the particular cache line of the plurality of cache lines;

deassert the control value associated with the particular cache line;

initialize cells of the particular cache line from a first cell up to and including a first cell index value associated with the first event identifier value;

perform in-array handling, within the particular cache line, for the first cell index value associated with the first event identifier value; and perform in-array handling, within the particular cache line, for a second cell index value associated with the second event identifier value.

14. The device of claim 11, wherein the processing device is further to, in response to the second event identifier value meeting a condition that is based on the first event identifier value and the window size:

determine that the control value is asserted;

determine that the first and second event identifier values are tracked in different cache lines of the plurality of cache lines;

deassert the control value;

initialize the cells of the particular cache line; and perform in-array handling, within the particular cache line, for a second cell index value associated with the second event identifier value.

15. The device of claim 7, wherein the processing device is further to, in response to the second event identifier value being so large that there is no overlap between currently tracked events by the window and the events that are tracked by the window after the event is processed:

make the first event identifier value equal to the second event identifier value;

assert control values except for the control value associated with the particular cache line;

deassert the control value associated with the particular cache line;

initialize the cells of the particular cache line; and perform in-array handling, within the particular cache line, for a second cell index value associated with the second event identifier value of the event.

16. The device of claim 7, wherein the processing device is further to, in response to the second event identifier value meeting a condition that is based on the first event identifier value:

determine that a second cache line value of the array for the event meets a condition that is based on the first cache line value, which is associated with the first event identifier value, and a number of the plurality of cache lines of the array;

make the first event identifier value equal to the second event identifier value;

assert control values except for the control value associated with the particular cache line;

deassert the control value associated with the particular cache line;

initialize the cells of the particular cache line; and perform in-array handling, within the particular cache line, for a second cell index value associated with the second event identifier value of the event.

17. The device of claim 7, wherein the processing device is further to, in response to the second event identifier value of the event being located beyond the window and still at a beginning of tracking of the events where the first event identifier value meets a condition that is based on the window size:

determine that a second cache line value of the array for the event meets a condition that is based on a first cache line value, which is associated with the first event identifier value, and a number of the plurality of cache lines of the array;

make the first event identifier value equal to the second event identifier value;

determine a state for some of the control values;

initialize some cells of the particular cache line depending on the state; and perform in-array handling, within the particular cache line, for a second cell index value associated with the second event identifier value of the event.

18. The device of claim 7, wherein the processing device is further to, in response to the second event identifier value meeting a condition that is based on the first event identifier value:

determine that a second cache line value of the array for the event meets a condition that is based on the first cache line value, which is associated with the first event identifier value, and a number of the plurality of cache lines of the array;

determine that each of the first event identifier value and the second event identifier value meet a condition that is based on the window size;

determine that the control value associated with the particular cache line is deasserted;

make the first event identifier value equal to the second event identifier value; and perform in-array handling, within the particular cache line, for a second cell index value associated with the second event identifier value of the event.

19. The device of claim 7, wherein the processing device is further to, in response to the second event identifier value meeting a condition that is based on the first event identifier value:

determine that a second cache line value of the array for the event meets a condition that is based on the first cache line value, which is associated with the first event identifier value, and a number of the plurality of cache lines of the array;

determine that each of the first event identifier value and the second event identifier value meet a condition that is based on the window size;

determine that the control value associated with the particular cache line is asserted;

make the first event identifier value equal to the second event identifier value;

deassert the control value for the particular cache line;

initialize the cells of the particular cache line; and perform in-array handling, within the particular cache line, for a second cell index value associated with the second event identifier value of the event.

20. The device of claim 7, wherein the processing device is further to, in response to the second event identifier value meeting a condition that is based on the first event identifier value:

determine that a second cache line value of the array for the event meets a condition that is based on the first cache line value, which is associated with the first event identifier value, and a number of the plurality of cache lines of the array;

determine that the first event identifier value meets a condition that is based on the window size;

determine that the second event identifier value meets a condition that is based on the window size;

make the first event identifier value equal to the second event identifier value;

assert the control values for the plurality of cache lines from a control value associated with a first cache line of the array and up to one less than a control value associated with the particular cache line;

initialize the cells of the particular cache line from a first cell of the particular cache line and up to a second cell index value associated with the second event identifier value; and perform in-array handling, within the particular cache line, for the second cell index value associated with the second event identifier value of the event.

21. A method comprising:

storing, in a cache, by a processing device, an array that tracks a plurality of events;

tracking a plurality of control values associated with a state of a plurality of cache lines of the array;

tracking, within the plurality of cache lines, a window of cell index values corresponding to event identifier values and having a window size that moves with an occurrence of any event that is positioned beyond the window; and in response to detecting an event, updating, by the processing device, a first value of a particular cache line of the plurality of cache lines based on a control value associated with the particular cache line and on whether the first value is located within a range of cell index values currently defined by the window.

22. The method of claim 21, wherein, in updating the first value of the particular cache line, at most the plurality of control values and a single cache line of the array are accessed in response to receipt of any given event.

23. The method of claim 21, wherein values within the plurality of cache lines comprise indicators corresponding to unique network packets received over a network, and wherein at most the plurality of control values and a single cache line of the array are accessed in response to receipt of any given network packet.

24. The method of claim 21, wherein tracking the window of cell index values further comprises cyclically moving the window in response to any event that is located beyond the window.

25. The method of claim 21, wherein the control values indicate whether to initialize corresponding cache lines, further comprising:

asserting the plurality of control values and setting a first event identifier value that is a highest value for received events to an initial value before tracking any received events; and initializing cells of the particular cache line in response to the control value, which is associated with the particular cache line, being asserted.

26. The method of claim 21, further comprising:

determining a first event identifier value that is a highest value for received events;

determining a second event identifier value for the event; and comparing the first event identifier value to the second event identifier value.

27. The method of claim 26, wherein the method further comprises, in response to the second event identifier value meeting a condition that is based on the first event identifier value and the window size, performing out-of-array event handling for the event.

28. The method of claim 26, further comprising:
determining a first cell index value as a combination of the first event identifier value and a number of possible tracked events for each of the plurality of cache lines;
determining a first cache line value of the plurality of cache lines, which is associated with the first event identifier value;
determining a second cell index value as a combination of the second event identifier value and the number of possible tracked events for each of the plurality of cache lines; and
determining a second cache line value of the plurality of cache lines, which is associated with the second event identifier value.

29. The method of claim 26, further comprising, in response to the second event identifier value being located beyond the window:
determining that a second cache line value of the array for the event meets a condition that is based on the first cache line value, which is associated with the first event identifier value, and a number of the plurality of cache lines of the array;
determining that the first event identifier value meets a condition that is based on the window size;
determining that the first and second event identifier values are tracked in the particular cache line of the plurality of cache lines;
making the first event identifier value equal to the second event identifier value;
determining a state of the control value;
initializing some of the cells of a first cache line; and
performing in-array handling, within the first cache line, for a cell index value corresponding to at least one of the first event identifier value or the second event identifier value.

30. The method of claim 26, further comprising, in response to the second event identifier value meeting a condition that is based on the first event identifier value:
determining that a second cache line value of the array for the event meets a condition that is based on the first cache line value, which is associated with the first event identifier value, and a number of the plurality of cache lines of the array;
determining that the first and second event identifier values are tracked in different cache lines of the plurality of cache lines;
determining that the first and second event identifier values are tracked in the particular cache line of the plurality of cache lines;
determining that the control value associated with the particular cache line is deasserted;
making the first event identifier value equal to the second event identifier value;
initializing the cells of an initial cache line from a first cell index value associated with the first event identifier value plus one up to a second cell index value associated with the second event identifier value; and
performing in-array event handling, within the initial cache line, for the second cell index value associated with the second event identifier value of the event.

31. The method of claim 26, further comprising, in response to the second event identifier value meeting a condition that is based on the first event identifier value:
determining that a second cache line value of the array for the event meets a condition that is based on a first cache line value, which is associated with the first event identifier value, and a number of the plurality of cache lines of the array;
determining that the first event identifier value meets a condition that is based on the window size;
determining that the first and second event identifier values are tracked in the particular cache line of the plurality of cache lines;
determining that the control value associated with the particular cache line is asserted;
making the first event identifier value equal to the second event identifier value;
deasserting the control value associated with the particular cache line;
initializing the cells for an initial cache line from a first cell of the initial cache line up to a second cell index value associated with the second event identifier value;
performing in-array handling, within the initial cache line, for a first cell index value associated with the first event identifier value; and
performing in-array handling, within the initial cache line, for a second cell index value associated with the second event identifier value.

32. The method of claim 26, further comprising, in response to the second event identifier value meeting a condition that is based on the first event identifier value:
determining that a second cache line value of the array for the event meets a condition that is based on the first cache line value, which is associated with the first event identifier value, and a number of the plurality of cache lines of the array;
determining that the first event identifier value meets a condition that is based on the window size;
determining that the first and second event identifier values are tracked in different cache lines of the plurality of cache lines;
determining that the control value associated with the particular cache line is deasserted;
making the first event identifier value equal to the second event identifier value;
asserting the control values, associated with those greater than an initial cache line value associated with the first event identifier value and sequential cache line values of the plurality of cache lines up to a final cache line value associated with the second event identifier value of the event; and
initializing cells within an initial cache line associated with the initial cache line value from beyond a first cell index value associated with the first event identifier value up to a last cell of the initial cache line.

33. The method of claim 26, further comprising, in response to the second event identifier value meeting a condition that is based on the first event identifier value:
determining that a second cache line value of the array for the event meets a condition that is based on the first cache line value, which is associated with the first event identifier value, and a number of the plurality of cache lines of the array;
determining that the first event identifier value meets a condition that is based on the window size;
determining that the first and second event identifier values are tracked in different cache lines of the plurality of cache lines;
determining that the control value associated with the particular cache line is asserted;
making the first event identifier value equal to the second event identifier value;

asserting the control values, associated with those greater than an initial cache line value associated with the first event identifier value and sequential cache line values of the plurality of cache lines up to a final cache line value associated with the second event identifier value of the event;

initializing the cells for an initial cache line associated with the initial cache line value; and performing in-array handling, within the initial cache line, for a first cell index value associated with the first event identifier value.

34. A non-transitory computer-readable storage medium storing instructions, which when executed by a processing device coupled to a cache, causes the processing device to perform operations comprising:

storing, in the cache, an array that tracks a plurality of events;

tracking a plurality of control values associated with a state of a plurality of cache lines of the array;

tracking, within the plurality of cache lines, a window of cell index values corresponding to event identifier values and having a window size that moves with an occurrence of any event that is positioned beyond the window; and in response to detecting an event, updating a first value of a particular cache line of the plurality of cache lines based on control values that correspond to the particular cache line and on whether the first value is located within a range of cell index values currently defined by the window.

* * * * *